United States Patent [19]
Allen

[11] 3,920,038
[45] Nov. 18, 1975

[54] BALL VALVE
[75] Inventor: Herbert Allen, Houston, Tex.
[73] Assignee: Cameron Iron Works, Inc., Houston,, Tex.
[22] Filed: May 28, 1974
[21] Appl. No.: 473,562

[52] U.S. Cl. ............... 137/330; 251/315; 251/174; 74/577 S
[51] Int. Cl.² ..................... F16K 5/06; F16K 25/04
[58] Field of Search ............ 251/174; 137/315, 330; 74/577 S

[56] References Cited
UNITED STATES PATENTS
1,290,507  1/1919  Carroll.............................. 74/577 S
3,157,190  11/1964  Allen ................................. 251/174

Primary Examiner—William R. Cline
Assistant Examiner—H. Jay Spiegel
Attorney, Agent, or Firm—W. F. Hyer; Marvin B. Eickenroht

[57] ABSTRACT

There is disclosed a ball valve having a ball closure and a seat which is pulled to successive rotative positions and toward the ball closure in response to opening and closing of the valve.

4 Claims, 6 Drawing Figures

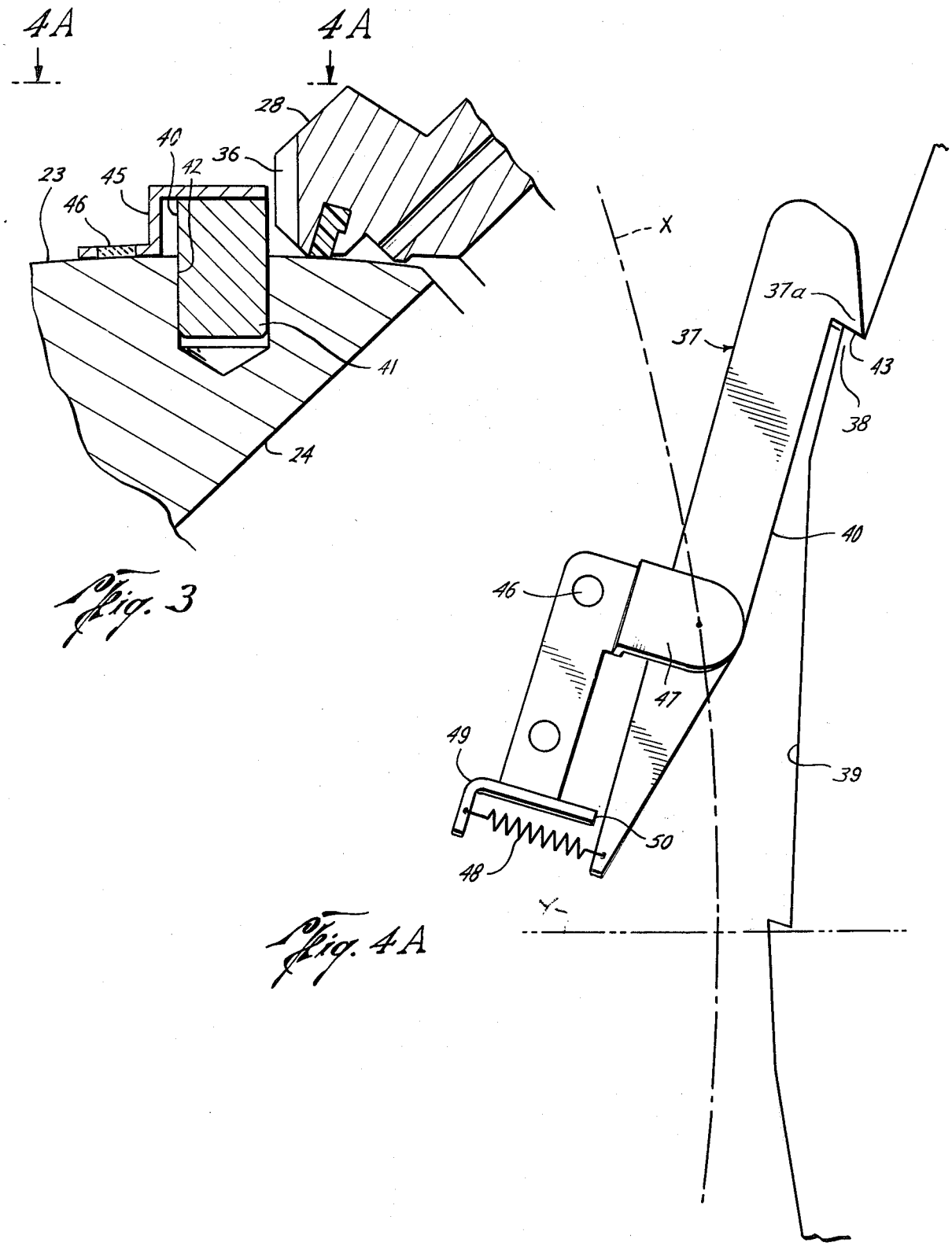

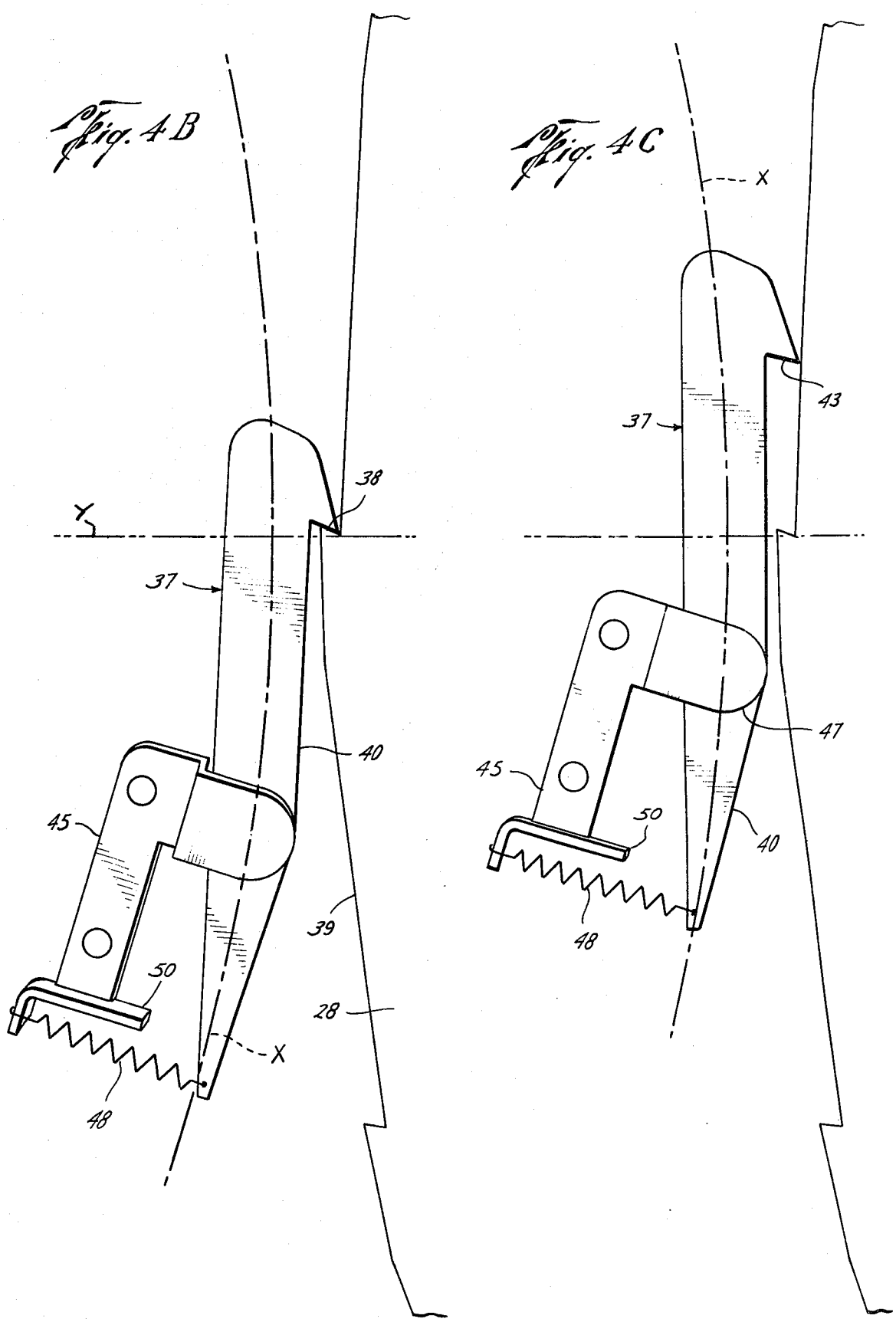

BALL VALVE

This invention relates generally to ball valves having seats which are rotated to successive rotative positions in response to movement of the ball closure between opened and closed positions, whereby erosion of the seats is distributed circumferentially, increasing their useful life.

As shown in Patent No. 3,157,190, seats have heretofore been rotated by means of a series of teeth disposed about them, and a pawl mounted on the ball closure for engaging and following one such tooth, and thus rotating the seat about its axis, during rotation of the closure in one direction; and, during reverse rotation of the closure, for disengaging from the tooth and assuming a position for engaging and following another tooth. The pawl tooth is disposed forwardly of its pivotal axis, as it engages and follows the seat tooth so as to push the seat from one rotative position to another. As a result, the pawl transmits a force to the seat which has an outward component urging the seat away from the closure, which sometimes creates a gap into which pipeline trash may enter and cause scoring and resistance to seat rotation.

An object of this invention is to provide a ball valve of this type in which the seat is not so urged, but is instead urged toward the closure, so that there is no tendency to create a gap of the type described.

This and other objects are accomplished, in accordance with the illustrated embodiment of the invention, by a ball valve in which a pawl mounted on the closure has a tooth positioned to engage and pull the seat from one rotative position to another with a force having a component acting toward the closure. For this purpose, the pawl is pivotally mounted on the closure about an axis which leads the pawl tooth as it pulls the seat tooth, and spring means mounted on the closure urges the pawl tooth into position for so engaging and pulling the seat tooth, and then disengaging therefrom for reengagement with another tooth upon further opening and closing movement of the closure.

Figure 2:
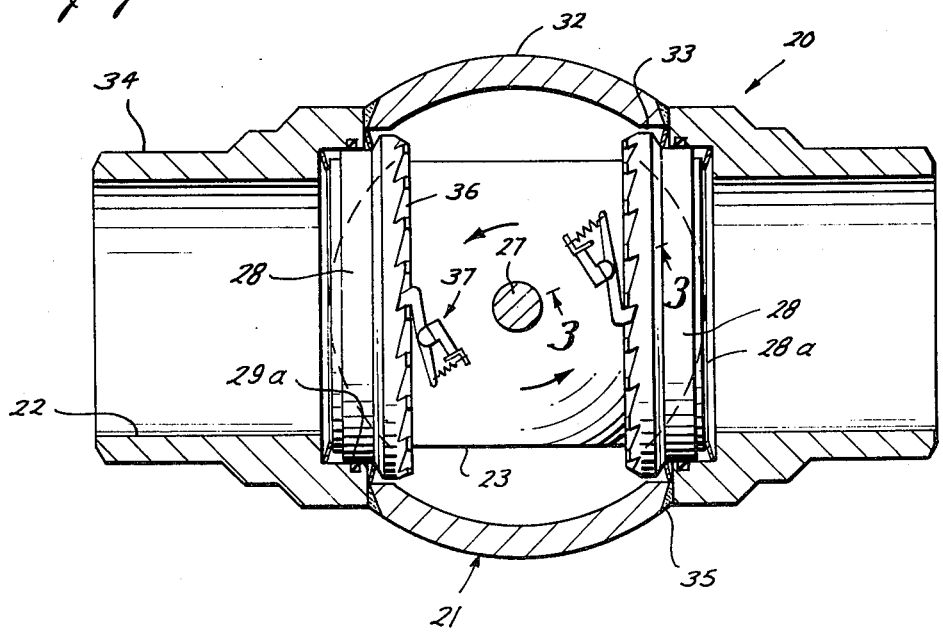
FIG. 2 is a horizontal sectional view, as seen along broken line 2—2 of FIG. 1, but with the closure in closed position.

FIG. 3 is an enlarged sectional view of a portion of the valve, as seen along broken line 3—3 of FIG. 2, but with the closure in open position; and FIGS. 4A, 4B and 4C are diagrammatic plan views illustrating the relative positions of a pawl tooth and a seat tooth as the pawl tooth engages and pulls the seat tooth from one position (FIG. 4A) to another (FIG. 4B), during rotation of the closure toward closed position, and then disengages from the seat tooth (FIG. 4C), during return movement toward a position for engaging and pulling another seat tooth.

Figure 1:
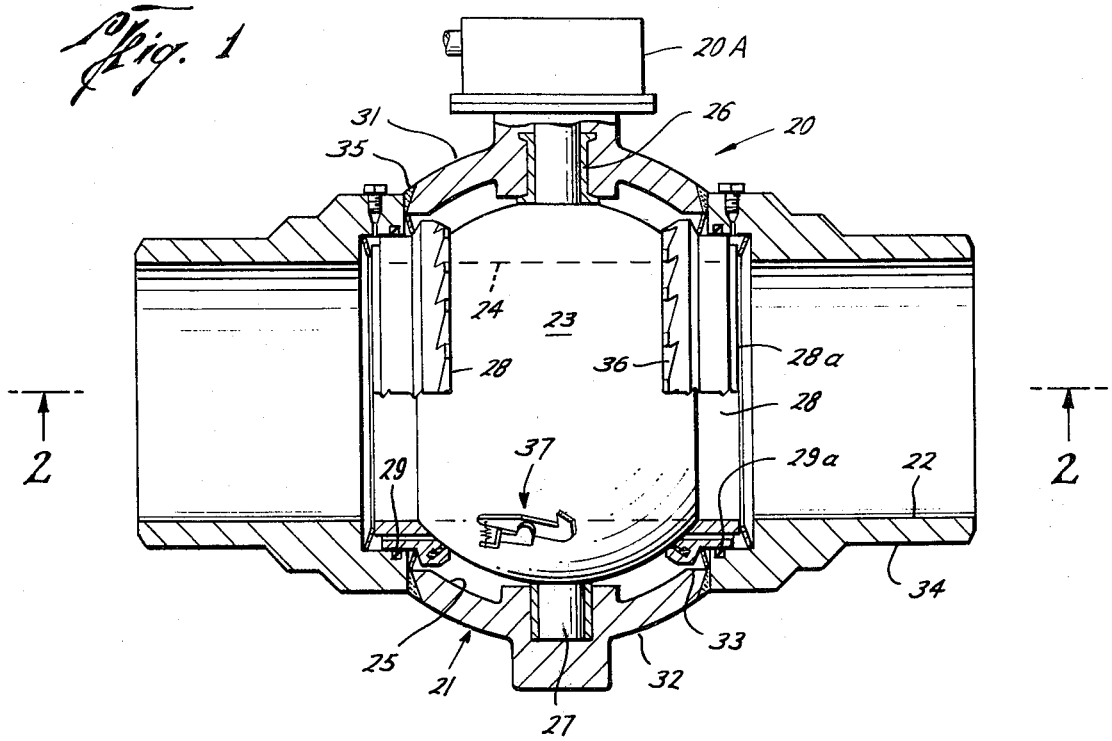
FIG. 1 is a vertical sectional view of a ball valve constructed in accordance with the present invention, and with the ball closure in open position.

With reference now to the drawings, the valve 20 is shown in FIGS. 1 and 2 to include a body 21 having a flowway 22, and a closure 23 having a port 24 and rotatably mounted within the body for selectively opening and closing the flowway. The closure lies within chamber 25 intermediate the opposite cylindrical ends of the flowway, and has upper and lower stems 26 and 27 journaled within bearings formed in the body. The upper stem extends through the upper bearing for connection to an operator 20A.

An annular seat 28 is mounted within an annular recess 29 at each intersection of flowway 22 with chamber 25 for rotation about its axis as well as limited sliding along its axis. The inner end of each seat is urged toward sealed engagement with closure 23 by means of a spring 28a, and each seat is sealably slidable over a seal ring 29a within a recess 29 in the cylindrical end of the flowway.

As in U.S. Pat. No. 3,732,885, chamber 25 is formed within a central body portion comprising upper and lower hemispherically shaped parts 31 and 32, respectively, having their edges welded together to mount stems 26 and 27 and capture the ball closure therebetween. Body 21 also includes a pair of tubular portions 34 welded at 35 to the central body portion around an opening 33. The recesses 29 for the seats 28 are formed in the tubular portions 34, so that when the latter are so connected to the central body portion, the seats 28 extend through openings 33.

Teeth 36 are formed on the inner end of each seat 28 close to the closure, and pawls 37 are mounted on closure 23 in position for a tooth 37a on each pawl to engage and pull a tooth on each seat as the closure is rotated from open to closed position. Then, upon return movement of the closure to its open position, the pawls are moved out of engagement with the seat teeth and returned to the position shown in FIG. 1, so that, as described in U.S. Pat. No. 3,157,190, the pawls cause the seats to be rotated from one position to another in response to each opening and closing movement of the valve.

Also, the pawls are mounted on the side of the closure opposite operator 20A, so that, with the valve in an upright position, as shown in FIGS. 1 and 2, there is substantially no relative movement between the closure and seats during final closing movement of the valve. As a result, there is minimum risk of damage to the seating surfaces between the closure and seats due to trash which tends to accumulate in the bottom of the valve. However, although in the illustrated embodiment, the pawls are arranged to rotate the seats during the end of closing movement of the closure, they may instead be arranged to rotate the seats at other selected times, such as toward the end of the opening movement of the closure.

Seat teeth 36 and pawl tooth 37a have confronting faces 38 and 43, respectively, which are preferably turned inwardly to form hooks. The back side 39 of each seat tooth is tapered gently from the outer end of one tooth to the base of another, whereby the pawl is free to disengage from one seat tooth and slide over the back side of another seat tooth as it moves from its FIG. 4B to its FIG. 4C position during movement of the closure back to its open position.

Pawl 37 comprises an arm 40 having a pin 41 integral with an intermediate portion thereof and fitting within a hole 42 in the closure so as to permit the pawl to swing about the pin. Pawl tooth 37a extends from the end of arm 40 which trails pin 41, as it moves into engagement with and pulls a seat tooth. Consequently, the pawl pulls the seat from one rotative position to another during the final closing movement of the closure. Pin 41 moves in an arcuate path X so that, during seat rotation, pawl tooth 37a moves continuously closer to the closure until it reaches the position shown in FIG. 4B, wherein it lies substantially within a vertical plane Y passing through the axes of rotation of the closure and seats.

Arm 40 is held on the closure by means of a keeper 45 welded at 46 to the ball and having a flange 47 extending over pin 41. Pawl tooth 37a is urged toward the seat by spring 48 fastened between a stop 49 on keeper 45 and the end of arm 40 of the pawl. As the pawl pulls a seat tooth, its arm 40 swings about pin 41 in a counterclockwise direction, and thus against the tension of spring 48.

After the seat has been rotated to its new position, and the closure is rotated back toward its open position, the pawl tooth slides over the back side of a seat tooth despite its outward urging by the spring. When the pawl has moved back out of engagement with the back side of the tooth, and thus to a position just beyond that of FIG. 4A, the arm will engage the end 50 of stop 49, so as to be repositioned, when the closure is returned to open position, for engaging and pulling another seat tooth as the closure is again moved to closed position.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A ball valve, comprising a body having a flowway therethrough, a ball closure having a port therethrough and being rotatable within the body between positions opening and closing the flowway, a seat rotatable about its axis and mounted within the body for engaging the closure, said seat having teeth about its periphery and a pawl mounted on the closure for engaging a tooth on the seat and pulling it from one rotative position to another with a force which has a component acting toward the closure, upon rotation of the closure.

2. A ball valve, comprising a body having a flowway therethrough, a ball closure having a port therethrough and being rotatable within the body between positions opening and closing the flowway, a seat rotatable about its axis and mounted within the body for engaging the closure, said seat having teeth about its periphery, and a pawl mounted on the closure and having a tooth positioned for engaging and pulling a seat tooth so as to rotate the seat about its axis, during rotation of the closure to one of its positions, with a force which has a component acting toward the closure, said pawl tooth disengaging from the seat tooth, during rotation of the closure to its other position, so as to return to a position for engaging and pulling another seat tooth during rotation of the closure back to its one position.

3. A ball valve, comprising a body having a flowway therethrough, a ball closure having a port therethrough and being rotatable within the body between positions opening and closing the flowway, a seat rotatable about its axis and mounted within the body for engaging the closure, said seat having teeth about its periphery, and a pawl pivotally mounted on the closure and having a tooth thereon which trails the pivot and which is positioned for engaging a seat tooth for pulling the seat about its axis, during rotation of the closure into one of its positions, and to disengage and move away from said tooth, during rotation of said closure into the other of its position, whereby said pawl tooth is repositioned for engaging and pulling another tooth upon return rotation of the ball closure into said one position.

4. A ball valve of the character defined in claim 3, including spring means on the closure urging said pawl tooth toward the seat.

\* \* \* \* \*